(12) United States Patent
Gross et al.

(10) Patent No.: US 11,500,411 B2
(45) Date of Patent: Nov. 15, 2022

(54) FORMULIZING TIME-SERIES SENSOR DATA TO FACILITATE COMPACT STORAGE AND ELIMINATE PERSONALLY IDENTIFIABLE INFORMATION

(71) Applicant: Oracle International Corporation, Redwood Shores, CA (US)

(72) Inventors: Kenny C. Gross, Escondido, CA (US); Guang C. Wang, San Diego, CA (US); Steven T. Jeffreys, Boxborough, MA (US); Alan Paul Wood, San Jose, CA (US); Coleen L. MacMillan, Salem, OR (US)

(73) Assignee: Oracle International Corporation, Redwood Shores, CA (US)

( * ) Notice: Subject to any disclaimer, the term of this patent is extended or adjusted under 35 U.S.C. 154(b) by 1141 days.

(21) Appl. No.: 16/052,638

(22) Filed: Aug. 2, 2018

(65) Prior Publication Data

US 2019/0243407 A1 Aug. 8, 2019

Related U.S. Application Data

(63) Continuation-in-part of application No. 15/887,234, filed on Feb. 2, 2018, now Pat. No. 11,392,850.

(51) Int. Cl.
*G06F 1/02* (2006.01)
*G06F 17/18* (2006.01)
(Continued)

(52) U.S. Cl.
CPC ............ *G06F 1/022* (2013.01); *G06F 1/0321* (2013.01); *G06F 16/2477* (2019.01); *G06F 17/18* (2013.01); *G06K 9/00496* (2013.01)

(58) Field of Classification Search
CPC ..................................................... G06F 1/0321
See application file for complete search history.

(56) References Cited

U.S. PATENT DOCUMENTS 9,110,862 B1 * 8/2015 O'Brien, Jr. ........... G06V 10/30
10,497,381 B2 * 12/2019 Short ................... G10L 21/0272
(Continued)

OTHER PUBLICATIONS

Gross et al.; "Spectral and Reconstruction of Telemetry Signals from Enterprise Computing Systems", Proc. 2005 IEEE Intn'l Multiconference in Computer Science & Computer Eng., Las Vegas, NV (Jun. 2005).

(Continued)

*Primary Examiner* — Raymond L Nimox
(74) *Attorney, Agent, or Firm* — Park, Vaughan, Fleming & Dowler LLP

(57) ABSTRACT

The disclosed embodiments relate to a system that compactly stores time-series sensor signals. During operation, the system receives original time-series signals comprising sequences of observations obtained from sensors in a monitored system. Next, the system formulizes the original time-series sensor signals to produce a set of equations, which can be used to generate synthetic time-series signals having the same correlation structure and the same stochastic properties as the original time-series signals. Finally, the system stores the formulized time-series sensor signals in place of the original time-series sensor signals.

20 Claims, 9 Drawing Sheets
(3 of 9 Drawing Sheet(s) Filed in Color)

(51) Int. Cl.
*G06K 9/00* (2022.01)
*G06F 16/2458* (2019.01)
*G06F 1/03* (2006.01)

(56) References Cited

U.S. PATENT DOCUMENTS

| 10,917,419 | B2* | 2/2021 | Crotinger | G06F 11/3419 |
|---|---|---|---|---|
| 2004/0162685 | A1* | 8/2004 | Gross | G01R 23/16 |
| | | | | 702/75 |
| 2008/0256398 | A1* | 10/2008 | Gross | G06F 11/00 |
| | | | | 714/47.2 |
| 2010/0325132 | A1* | 12/2010 | Liu | G06F 16/24568 |
| | | | | 707/769 |
| 2015/0058388 | A1* | 2/2015 | Smigelski | G06F 17/141 |
| | | | | 708/208 |

OTHER PUBLICATIONS

Goring et al.; "Despiking Acoustic Doppler Velocimeter Data", Journal of Hydraulic Engineering, vol. 128, No. 1, Jan. 1, 2002.

* cited by examiner

FORMULIZING TIME-SERIES SENSOR DATA TO FACILITATE COMPACT STORAGE AND ELIMINATE PERSONALLY IDENTIFIABLE INFORMATION

CROSS-REFERENCE TO RELATED APPLICATIONS

This application is a continuation-in-part of, and hereby claims priority under 35 U.S.C § 120 to, pending U.S. patent application Ser. No. 15/887,234, entitled "Synthesizing High-Fidelity Time-Series Sensor Signals to Facilitate Machine-Learning Innovations," by inventors Kenny C. Gross, et al., filed 2 Feb. 2018.

BACKGROUND

Field

The disclosed embodiments generally relate to techniques for storing time-series sensor data. More specifically, the disclosed embodiments relate to a technique for formulizing time-series sensor data into a set of equations, which are extremely compact, and which can be used to generate synthetic time-series signals that have the same correlation structure and the same stochastic properties as the original time-series sensor data.

Related Art

Enormous numbers of sensors are presently deployed to monitor assets in critical systems. For example, a medium-sized computer data center can include over 1,000,000 sensors monitoring thousands of business-critical servers, a modern passenger jet can include 75,000 sensors monitoring aspects of the jet's performance, and an oil refinery can include over 1,000,000 sensors monitoring various refining processes and associated safety margins.

These sensors produce extremely large volumes of time-series data, which is typically stored in time-series databases. This makes it possible for machine-learning (ML) researchers to subsequently access the stored time-series sensor data to develop, evaluate and optimize new ML techniques, which can be used to improve the efficiency and reliability of the monitored systems.

However, it is becoming challenging to accommodate the large volumes of time-series sensor data that are presently being generated by monitored systems within the finite storage space that is available in time-series databases. Moreover, storing such time-series data has also given rise to concerns about inadvertently disclosing personally identifiable information (PII), which may be embedded in the time-series sensor data.

Hence, what is needed is a technique for storing time-series sensor data in a manner that conserves storage space and also addresses concerns about inadvertently disclosing PIT.

SUMMARY

The disclosed embodiments relate to a system that compactly stores time-series sensor signals. During operation, the system receives original time-series signals comprising sequences of observations obtained from sensors in a monitored system. Next, the system formulizes the original time-series sensor signals to produce a set of equations, which can be used to generate synthetic time-series signals having the same correlation structure and the same stochastic properties as the original time-series signals. Finally, the system stores the formulized time-series sensor signals in place of the original time-series sensor signals.

In some embodiments, formulizing the original time-series signals includes decomposing the original time-series signals into deterministic and stochastic components.

In some embodiments, in response to receiving a request to access the time-series sensor signals, the system uses the formulized time-series sensor signals to generate synthetic time-series signals having the same correlation structure and the same stochastic properties as the original time-series signals. The system then returns the generated synthetic time-series signals in response to the request.

In some embodiments, the system additionally applies machine-learning (ML) techniques to the generated synthetic time-series signals to facilitate anomaly discovery operations.

In some embodiments, formulizing the original time-series sensor signals involves using a telemetry parameter synthesis system (TPSS) technique to produce high-fidelity synthesis equations, which can then be used to generate the synthetic time-series signals having the same correlation structure and the same stochastic properties as the original time-series signals.

In some embodiments, using the TPSS technique to produce the high-fidelity synthesis equations involves: using an autocorrelation technique to determine a longest period for each signal in the original time-series signals; selecting a portion of the original time-series signals that contains an integer number of periods; determining a number of Fourier modes, $N_{mode}$, which equals a number of peaks in a spectral-density function for the original time-series signals; selecting the maximum $N_{mode}$ Fourier modes; and using the selected $N_{mode}$ Fourier modes to produce the high-fidelity synthesis equations.

In some embodiments, the synthetic time-series signals have the same serial-correlation structure, cross-correlation structure, and stochastic content as the original time-series signals. In some embodiments, the stochastic content includes one or more of the following: a mean; a variance; a skewness; a kurtosis; and Kolmogorov-Smirnov test statistics.

In some embodiments, formulizing time-series sensor signals eliminates any personally identifiable information (PII), which may have been present in the original time-series sensor data.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1A:
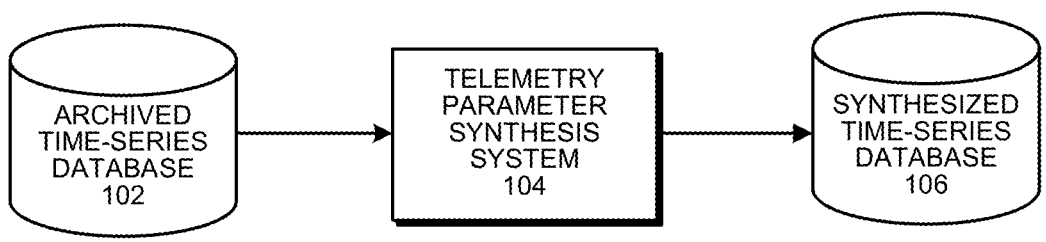
FIG. 1A illustrates a TPSS system that produces a statistically synthesized time-series database.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a system that facilitates capturing large time-series databases and reducing those databases to a collection of formulae, which are stored and subsequently extracted, instead of storing the "real" time-series data. This new Automated Formulized Data Reduction (AFDR) system solves problems for machine-learning (ML) researchers by (1) reducing archive data volumes by approximately five orders of magnitude, and by (2) eliminating security and privacy restrictions associated with using "customer" time-series data (because there is no possibility of the AFDR system capturing or externally communicating any customer PII).

This disclosed system solves these problems by "formulizing" time-series telemetry streams into a set of equations, wherein only the equations are saved and no customer data is saved. Note that there is no possibility of capturing any customer PII in such equations. In order to formulize the time-series signals, the disclosed system makes use of a telemetry parameter synthesis system (TPSS) technique that allows time-series signals to be processed and decomposed into their deterministic and stochastic components. These components can be used to generate synthesized signals that possess exactly the same deterministic structure and stochastic distributions. Note that the TPSS technique was previously developed by one of the inventors. See "Spectral Decomposition and Reconstruction of Telemetry Signals from Enterprise Computing Systems," K. C. Gross and E. Schuster, Proc. 2005 IEEE International Multiconference in Computer Science & Computer Eng., Las Vegas, Nev. (June 2005).

During operation, the new TPSS-based system takes time-series signals and generates new synthesized time-series signals that yield exactly the same quantitative conclusions when analyzed with ML techniques. The synthetic time-series signals generated by TPSS meet all of the following functional requirements with respect to the original time-series signals: (1) the same serial correlation structure; (2) the same multivariate cross-correlation structure; (3) the same stochastic structure, with all stochastic components matching in mean, variance, skewness, and kurtosis.

Moreover, the TPSS technique works for any level of signal-to-noise (S/N) ratio, and adapts itself to the S/N ratios for individual signals. Hence, it works autonomically for heterogeneous collections of time-series signals, which can range from extremely accurate transducer outputs with noise ratios of a fraction of a percent, to purely random signals possessing any inherent process distributions (e.g., uniform, Gaussian, Poisson, etc.).

This new TPSS AFDR technique provides important advantages for ML researchers, by (1) compactly storing telemetry black-box recorder (BBR) files; and by (2) avoiding security and privacy restrictions that may be associated with the original raw data. Note that the AFDR technique obviates security and privacy concerns because there is no possibility of any alphanumeric information, pictures, videos, voice streams, credit card numbers, Social Security numbers, or any conceivable PII being captured in the TPSS AFDR formulae.

Compactly storing BBR files provides a number of advantages. Hundreds of thousands of servers around the world sold during the past 12 years by Sun Microsystems™, and the Oracle Corporation™ have internal BBR archive files containing a lifetime history of internal system telemetry from sensors that measure hundreds of internal temperatures, voltages, currents, fan RPMs, and power metrics. These BBR files can play a vital role in resolution of customer escalations, and provide a tremendous advantage by facilitating rapid root cause analyses, wherein the BBR files for problematic servers can be analyzed to identify the components experiencing issues.

The disclosed TPSS AFDR technique has been demonstrated to reduce data volumes in large time-series repositories by five orders of magnitude. This means that BBR files located on enterprise computing systems are reduced to a negligible memory footprint. Moreover, the TPSS AFDR formulae enable synthesized data streams to be generated outside of a customer site in "cloud data centers," thereby remotely creating data streams that are extremely valuable for ML and deep-learning (DL) researchers because they can be used to evaluate, tune, and optimize new pattern-recognition innovations.

TPSS AFDR System

FIG. 1A illustrates a conventional TPSS system that produces a statistically synthesized time-series database. As illustrated in FIG. 1A, an archived time-series database 102 is fed through a TPSS system 104 to produce a synthesized time-series database 106. Note that while converting archived time-series database 102 into synthesized time-series database 106 all PII is removed. This makes it possible to apply ML analysis techniques to the synthesized time-series database 106 without having to worry about inadvertently disclosing PII. However, note that the size of synthesized time-series database 106 is the same as the size of time-series database 102, so there is no reduction in storage space.

Figure 1B:
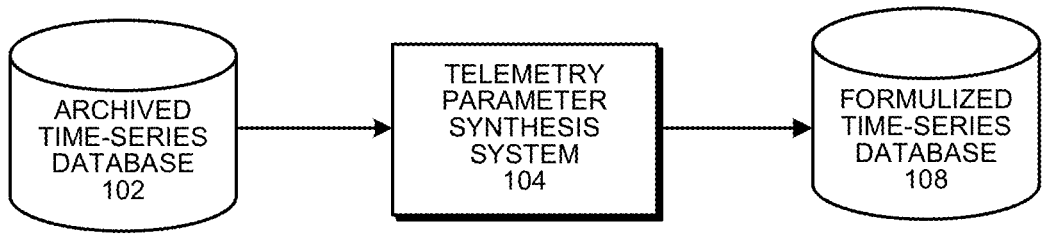
FIG. 1B illustrates a TPSS system that produces a formulized time-series database in accordance with the disclosed embodiments.

FIG. 1B illustrates a new TPSS AFDR system that produces a formulized time-series database in accordance with the disclosed embodiments. As illustrated in FIG. 1B, archived time-series database 102 is fed through a TPSS system 104 to produce a set of formulae, which are stored in a formulized time-series database 108. This enables the set of formulae to be subsequently retrieved and used to generate synthesized time-series signals. In addition to eliminating problems with possibly disclosing PII, the new TPSS AFDR system also reduces storage requirements by as much as five orders of magnitude. This makes it possible to compactly store extremely large volumes of time-series data for subsequent analysis.

Example

Figure 2:
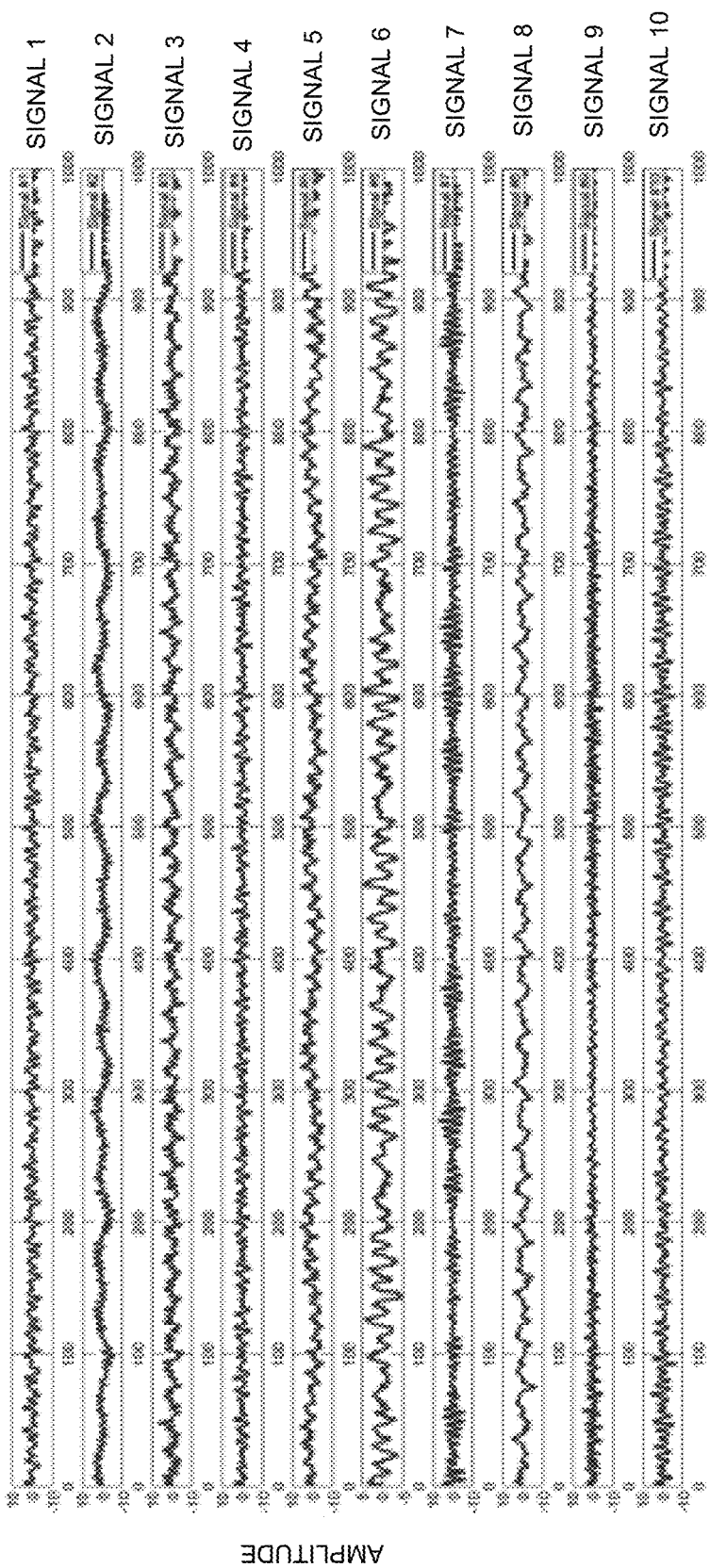
FIG. 2 presents a graph illustrating 10 exemplary raw time-series sensor signals in accordance with the disclosed embodiments.

We now present an example illustrating how raw time-series signals can be converted into formulae, which can be subsequently used to generate corresponding synthesized time-series signals. We start with 10 raw time-series sensor signals, which are illustrated in FIG. 2, and are labeled as signal 1 through signal 10.

By applying the TPSS AFDR technique, signal 1 can be decomposed into a corresponding Fourier composite equation, which includes the following terms representing a selected set of maximum Fourier modes.

$$1.223 \times \sin\left(\frac{\pi}{2} + 0.11\pi x - 1.57\right) + $$
$$1.92 \times \sin\left(\frac{\pi}{2} + 0.25\pi x - 1.59\right) + 1.21 \times \sin\left(\frac{\pi}{2} + 0.35\pi x - 1.557\right)$$

Figure 3:
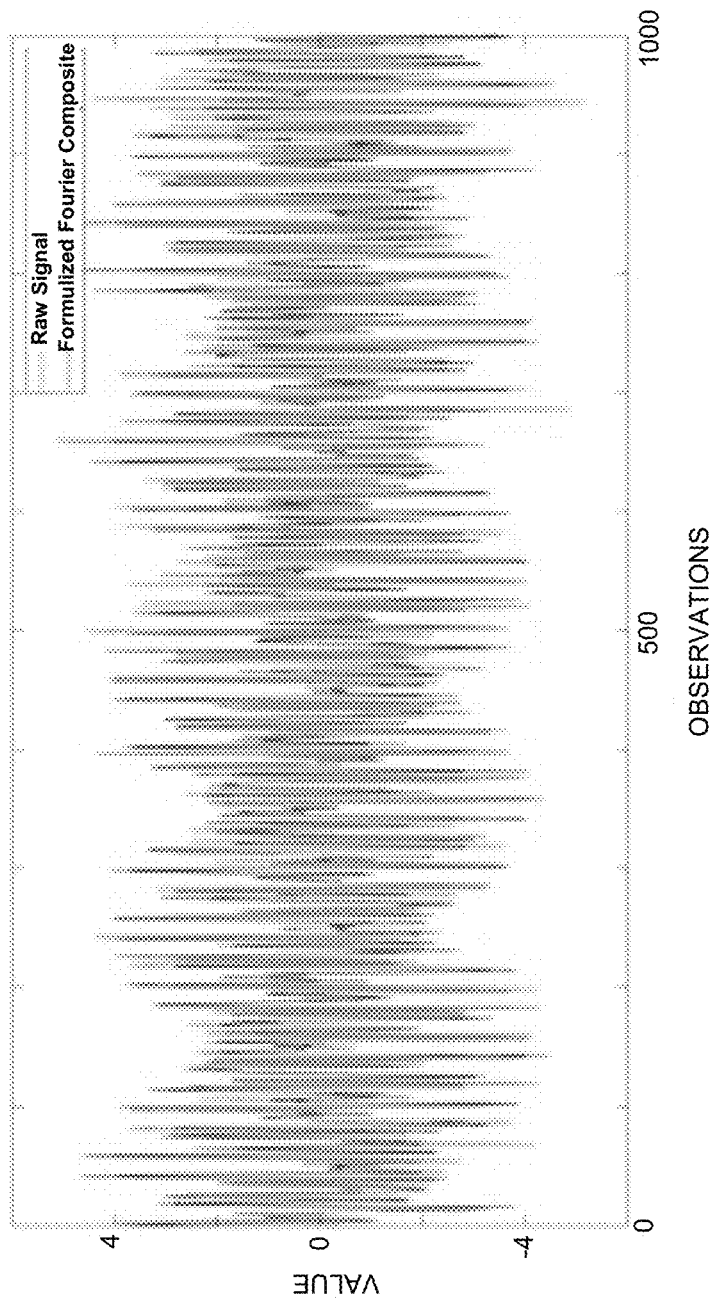
FIG. 3 presents a graph illustrating a raw signal versus a corresponding formulized composite signal for signal 1 in accordance with the disclosed embodiments.
Figure 4A:
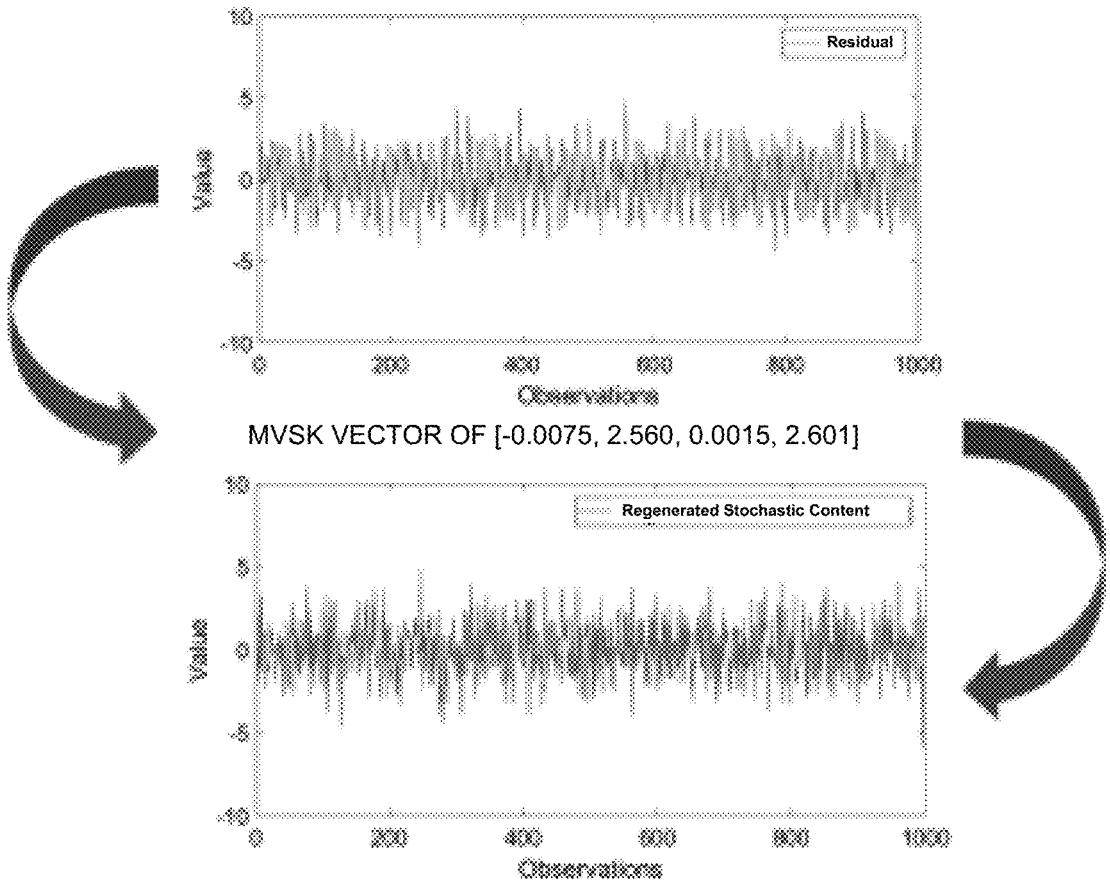
FIG. 4A presents graphs illustrating residuals between a raw signal and a corresponding Fourier composite signal for signal 1 in accordance with the disclosed embodiments.
Figure 4B:
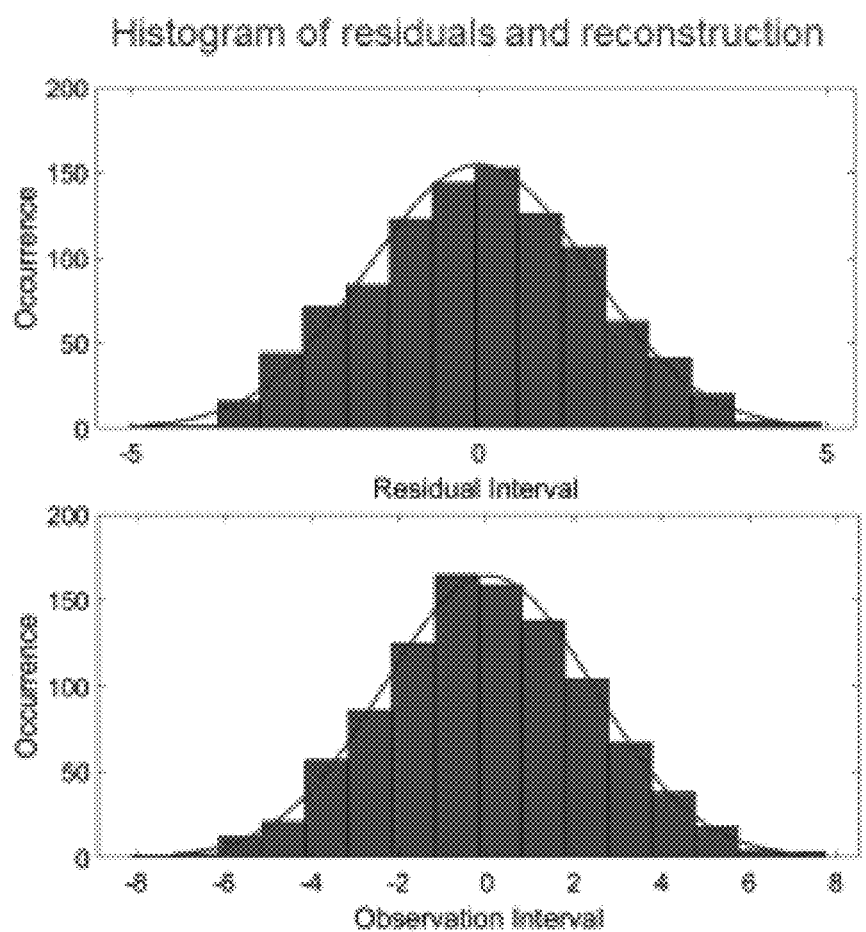
FIG. 4B presents histograms of residual intervals and observation intervals for signal 1 in accordance with the disclosed embodiments.

FIG. 3 presents a corresponding graph for signal 1 illustrating a raw signal versus a corresponding formulized Fourier composite signal. To provide additional details, FIG. 4A presents graphs illustrating the residuals between the raw signal and the Fourier composite signal, wherein the intervening Mean Variance Skewness Kurtosis (MVSK) vector is [−0.0075, 2.560, 0.0015, 2.601]. Moreover, FIG. 4B presents corresponding histograms of residual intervals and observation intervals.

Signal 2 can similarly be decomposed into a corresponding Fourier composite equation, which includes the following terms representing a selected set of maximum Fourier modes.

$$1.175 \times \sin\left(\frac{\pi}{2} + 0.016\pi x - 0.499\right) + $$
$$1.392 \times \sin\left(\frac{\pi}{2} + 0.036\pi x - 0.4523\right) + 1.382 \times \sin\left(\frac{\pi}{2} + 0.364\pi x - 2.66\right)$$

Figure 5:
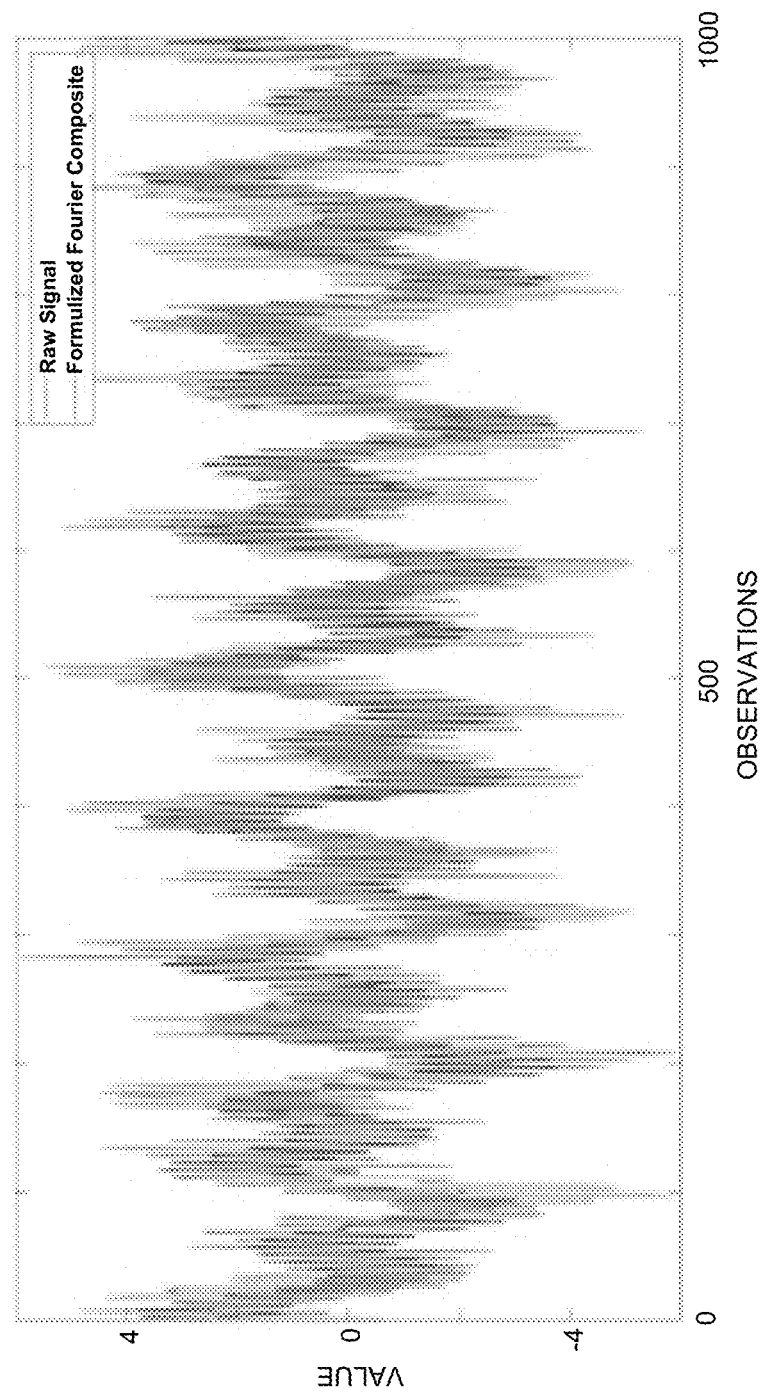
FIG. 5 presents a graph illustrating a raw signal versus a corresponding formulized composite signal for signal 2 in accordance with the disclosed embodiments.

FIG. 5 presents a graph for signal 2 illustrating a raw signal versus a corresponding formulized Fourier composite signal, wherein the corresponding MVSK vector is [0.0000, 3.130, 0.074, 2.702].

Also, signal 6 can be decomposed into a corresponding Fourier composite equation, which includes the following terms representing a selected set of maximum Fourier modes.

$$1.059 \times \sin\left(\frac{\pi}{2} + 0.066\pi x - 0.4827\right) + $$
$$1.538 \times \sin\left(\frac{\pi}{2} + 0.15\pi x - 1.56\right) + 0.8726 \times \sin\left(\frac{\pi}{2} + 0.164\pi x - 2.64\right)$$

Figure 6:
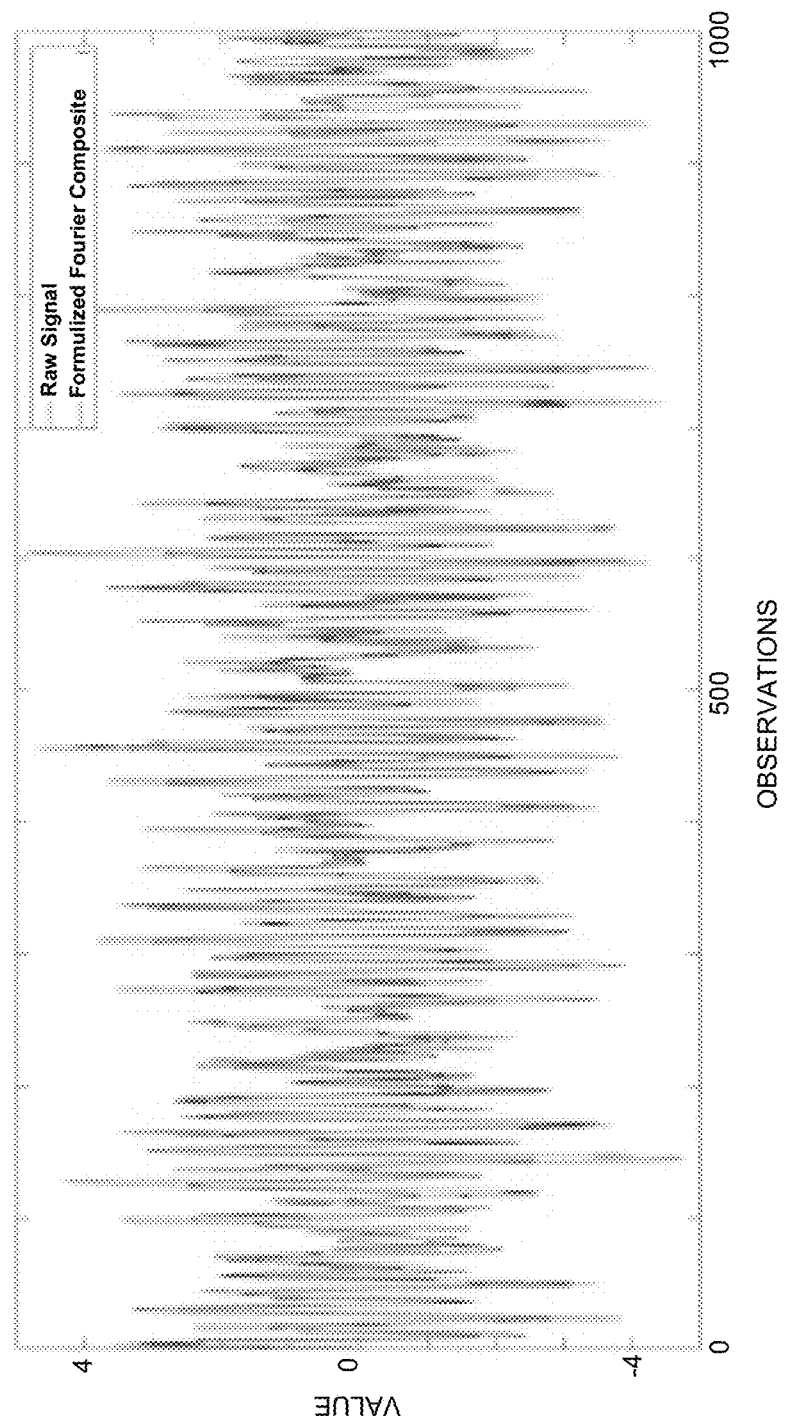
FIG. 6 presents a graph illustrating a raw signal versus a corresponding formulized composite signal for signal 6 in accordance with the disclosed embodiments.

FIG. 6 presents a graph for signal 6 illustrating a raw signal versus a corresponding formulized Fourier composite signal, wherein the corresponding MVSK vector is [0.0000, 1.2832, −0.0415, 2.8282].

Process of Compactly Storing Time-Series Sensor Data

Figure 7:
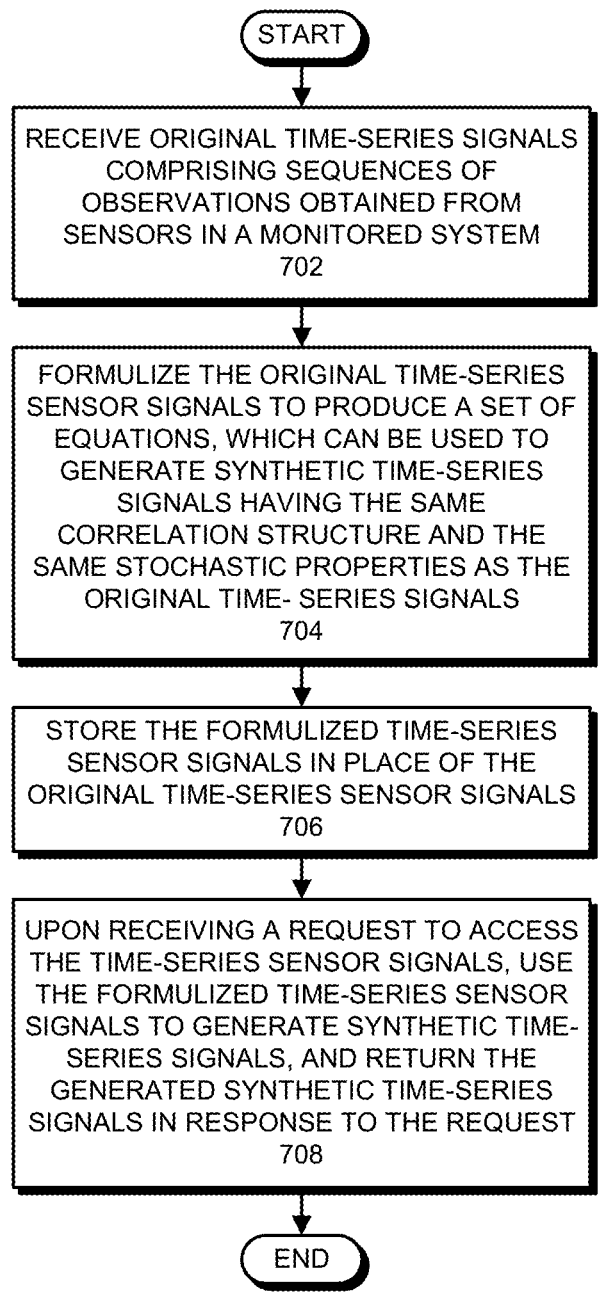
FIG. 7 presents a flow chart illustrating the process of compactly storing time-series sensor data in accordance with the disclosed embodiments.

FIG. 7 presents a flow chart illustrating the process of compactly storing time-series sensor data in accordance with the disclosed embodiments. During operation, the system receives original time-series signals comprising sequences of observations obtained from sensors in a monitored system (step 702). Next, the system formulizes the original time-series sensor signals to produce a set of equations, which can be used to generate synthetic time-series signals having the same correlation structure and the same stochastic properties as the original time-series signals (step 704). The system then stores the formulized time-series sensor signals in place of the original time-series sensor signals (step 706). Next, upon receiving a request to access the time-series sensor signals, the system uses the formulized time-series sensor signals to generate synthetic time-series signals, and then returns the generated synthetic time-series signals in response to the request (step 708)

Figure 8:
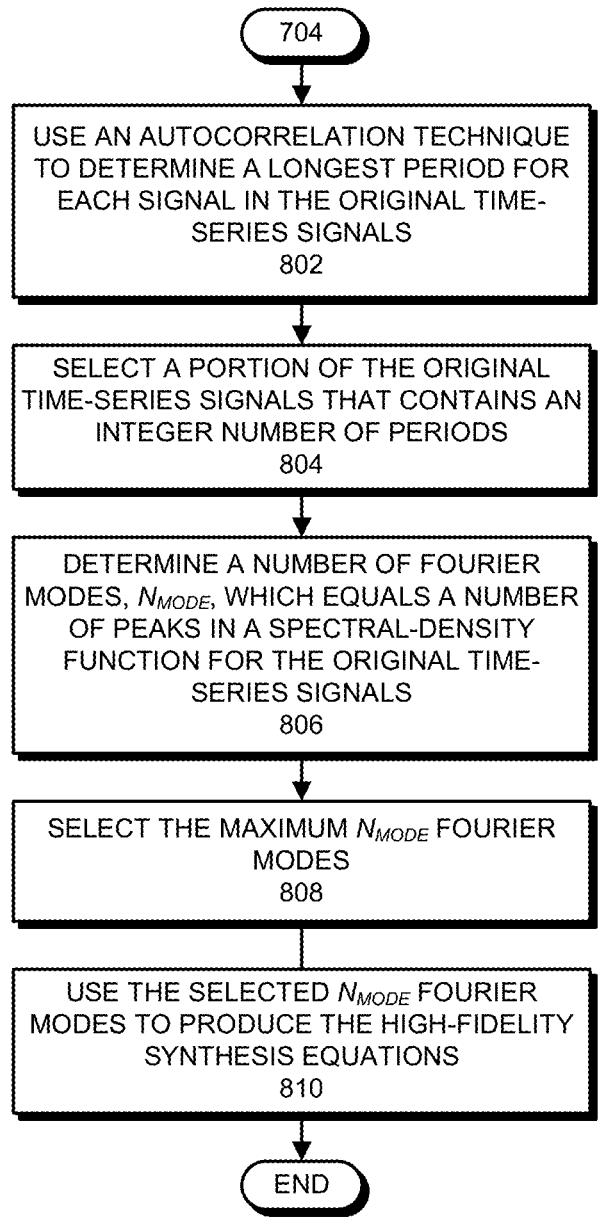
FIG. 8 presents a flow chart illustrating the process of formulizing time-series sensor data in accordance with the disclosed embodiments.

FIG. 8 presents a flow chart illustrating the process of using the TPSS technique to formulize time-series sensor data in accordance with the disclosed embodiments. (This flow chart illustrates in more detail the operations that take place in step 704 in the flow chart in FIG. 7.) First, the system uses an autocorrelation technique to determine a longest period for each signal in the original time-series signals (step 802). Next, the system selects a portion of the original time-series signals that contains an integer number of periods (step 804). The system then determines a number of Fourier modes, $N_{mode}$, which equals a number of peaks in a spectral-density function for the original time-series signals (step 806). Next, the system selects the maximum $N_{mode}$ Fourier modes (step 808). Finally, the system uses the selected $N_{mode}$ Fourier modes to produce the high-fidelity synthesis equations (step 810).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for compactly storing time-series sensor signals, comprising:
 receiving from storage original time-series signals comprising sequences of observations obtained from sensors in a monitored system, wherein the original time-series occupy a first amount of storage space;
 formulizing the original time-series sensor signals to produce a set of equations, which can be used to generate synthetic time-series signals having the same correlation structure and the same stochastic properties as the original time-series signals; and
 storing the formulized time-series sensor signals in place of the original time-series sensor signals, wherein the formulized time-series sensor signals occupy less than the first amount of storage space.

2. The method of claim 1, wherein formulizing the original time-series signals includes decomposing the original time-series signals into deterministic and stochastic components.

3. The method of claim 1, wherein the method further comprises:
 receiving a request to access the time-series sensor signals; and
 in response to the request,
  using the formulized time-series sensor signals to generate synthetic time-series signals having the same correlation structure and the same stochastic properties as the original time-series signals, and
  returning the generated synthetic time-series signals in response to the request.

4. The method of claim 3, wherein the method further comprises applying machine-learning (ML) techniques to the generated synthetic time-series signals to facilitate anomaly discovery operations.

5. The method of claim 1, wherein formulizing the original time-series sensor signals involves using a telemetry parameter synthesis system (TPSS) technique to produce high-fidelity synthesis equations, which can then be used to generate the synthetic time-series signals having the same correlation structure and the same stochastic properties as the original time-series signals.

6. The method of claim 5, wherein using the TPSS technique to produce the high-fidelity synthesis equations includes:
 using an autocorrelation technique to determine a longest period for each signal in the original time-series signals;
 selecting a portion of the original time-series signals that contains an integer number of periods;
 determining a number of Fourier modes, $N_{mode}$, which equals a number of peaks in a spectral-density function for the original time-series signals;
 selecting the maximum $N_{mode}$ Fourier modes; and
 using the selected $N_{mode}$ Fourier modes to produce the high-fidelity synthesis equations.

7. The method of claim 1, wherein the synthetic time-series signals have the same serial-correlation structure, cross-correlation structure, and stochastic content as the original time-series signals.

8. The method of claim 7, wherein the stochastic content includes one or more of the following:
 a mean;
 a variance;
 a skewness;
 a kurtosis; and
 Kolmogorov-Smirnov test statistics.

9. The method of claim 1, wherein formulizing time-series sensor signals eliminates any personally identifiable information (PII), which may have been present in the original time-series sensor data.

10. A non-transitory computer-readable storage medium storing instructions that when executed by a computer cause the computer to perform a method for compactly storing time-series sensor signals, the method comprising:
 receiving from storage original time-series signals comprising sequences of observations obtained from sensors in a monitored system, wherein the original time-series occupy a first amount of storage space;
 formulizing the original time-series sensor signals to produce a set of equations, which can be used to generate synthetic time-series signals having the same correlation structure and the same stochastic properties as the original time-series signals; and
 storing the formulized time-series sensor signals in place of the original time-series sensor signals, wherein the formulized time-series sensor signals occupy less than the first amount of storage space.

11. The non-transitory computer-readable storage medium of claim 10, wherein formulizing the original time-series signals includes decomposing the original time-series signals into deterministic and stochastic components.

12. The non-transitory computer-readable storage medium of claim 10, wherein the method further comprises:
 receiving a request to access the time-series sensor signals; and
 in response to the request,
  using the formulized time-series sensor signals to generate synthetic time-series signals having the same correlation structure and the same stochastic properties as the original time-series signals, and
  returning the generated synthetic time-series signals in response to the request.

13. The non-transitory computer-readable storage medium of claim 12, wherein the method further comprises applying machine-learning (ML) techniques to the generated synthetic time-series signals to facilitate anomaly discovery operations.

14. The non-transitory computer-readable storage medium of claim 10, wherein formulizing the original time-series sensor signals involves using a telemetry parameter synthesis system (TPSS) technique to produce high-fidelity synthesis equations, which can then be used to generate the synthetic time-series signals having the same correlation structure and the same stochastic properties as the original time-series signals.

15. The non-transitory computer-readable storage medium of claim 14, wherein using the TPSS technique to produce the high-fidelity synthesis equations includes:
 using an autocorrelation technique to determine a longest period for each signal in the original time-series signals;

selecting a portion of the original time-series signals that contains an integer number of periods;

determining a number of Fourier modes, $N_{mode}$, which equals a number of peaks in a spectral-density function for the original time-series signals;

selecting the maximum $N_{mode}$ Fourier modes; and using the selected $N_{mode}$ Fourier modes to produce the high-fidelity synthesis equations.

16. The non-transitory computer-readable storage medium of claim 10, wherein the synthetic time-series signals have the same serial-correlation structure, cross-correlation structure, and stochastic content as the original time-series signals.

17. The non-transitory computer-readable storage medium of claim 16, wherein the stochastic content includes one or more of the following:
   a mean;
   a variance;
   a skewness;
   a kurtosis; and
   Kolmogorov-Smirnov test statistics.

18. The non-transitory computer-readable storage medium of claim 10, wherein formulizing time-series sensor signals eliminates any personally identifiable information (PII), which may have been present in the original time-series sensor data.

19. A system that facilitates compactly storing time-series sensor signals, comprising:
   at least one processor and at least one associated memory; and
   a compaction mechanism that executes on the at least one processor, wherein during operation, the compaction mechanism:
      receives from storage original time-series signals comprising sequences of observations obtained from sensors in a monitored system, wherein the original time-series occupy a first amount of storage space;
      formulizes the original time-series sensor signals to produce a set of equations, which can be used to generate synthetic time-series signals having the same correlation structure and the same stochastic properties as the original time-series signals, and
      stores the formulized time-series sensor signals in place of the original time-series sensor signals, wherein the formulized time-series sensor signals occupy less than the first amount of storage space.

20. The system of claim 19, wherein the compaction mechanism is additionally configured to:
   receive a request to access the time-series sensor signals; and
   in response to the request,
      use the formulized time-series sensor signals to generate synthetic time-series signals having the same correlation structure and the same stochastic properties as the original time-series signals, and
      return the generated synthetic time-series signals in response to the request.

* * * * *